(12) United States Patent
Diesi et al.

(10) Patent No.: US 9,547,577 B2
(45) Date of Patent: Jan. 17, 2017

(54) METHOD AND APPARATUS FOR DETERMINING PROCESSOR PERFORMANCE

(75) Inventors: Vincenzo Diesi, London (GB); Lionel Lemarie, London (GB); Paul Alexander Thomson, London (GB)

(73) Assignee: Sony Computer Entertainment Europe Limited (GB)

( * ) Notice: Subject to any disclaimer, the term of this patent is extended or adjusted under 35 U.S.C. 154(b) by 845 days.

(21) Appl. No.: 13/395,745

(22) PCT Filed: Sep. 13, 2010

(86) PCT No.: PCT/GB2010/051530
§ 371 (c)(1),
(2), (4) Date: May 24, 2012

(87) PCT Pub. No.: WO2011/030164
PCT Pub. Date: Mar. 17, 2011

(65) Prior Publication Data
US 2012/0232845 A1    Sep. 13, 2012

(30) Foreign Application Priority Data

Sep. 14, 2009 (GB) .................................. 0916095.3
Sep. 14, 2009 (GB) .................................. 0916097.9
Dec. 22, 2009 (GB) .................................. 0922452.8

(51) Int. Cl.
*G06F 11/34* (2006.01)
*G06T 15/00* (2011.01)

(52) U.S. Cl.
CPC ....... *G06F 11/3419* (2013.01); *G06F 11/3476* (2013.01); *G06T 15/005* (2013.01); *G06F 2201/88* (2013.01)

(58) Field of Classification Search
CPC combination set(s) only.
See application file for complete search history.

(56) References Cited

U.S. PATENT DOCUMENTS 6,084,591 A * 7/2000 Aleksic .......................... 345/422
6,148,396 A 11/2000 Chrysos et al.
(Continued)

FOREIGN PATENT DOCUMENTS

JP 61-117633 A 6/1986

OTHER PUBLICATIONS

European Office Action for Application No. 10760390 dated Sep. 30, 2013.
(Continued)

*Primary Examiner* — Huan Tran
(74) *Attorney, Agent, or Firm* — Lerner, David, Littenberg, Krumholz & Mentlik, LLP

(57) ABSTRACT

A method of determining the performance of a processor when processing a unit of data is described. The method comprises the steps of: receiving, at a first sample rate, information indicating the performance of the processor when processing the unit of data; generating an identifier that identifies the unit of data being processed; comparing the identifier with previous identifiers at a second sample rate; and outputting the identifier of the unit of data being processed and the performance information when, during the comparing step, a predetermined condition is met.

18 Claims, 5 Drawing Sheets

(56) References Cited

U.S. PATENT DOCUMENTS

| | | |
|---|---|---|
| 6,751,282 B1 | 6/2004 | Kramer et al. |
| 6,880,072 B1 | 4/2005 | Giles |
| 2004/0088699 A1* | 5/2004 | Suresh .......................... 717/174 |
| 2008/0033696 A1* | 2/2008 | Aguaviva et al. ............ 702/186 |

OTHER PUBLICATIONS

International Search Report and Written Opinion, PCT/GB2010/051530, dated Dec. 14, 2010.
Search Report from GB Application No. 0922452 dated Apr. 12, 2010.
European communication for Application No. 10760390.4 dated May 19, 2015.

* cited by examiner

TileID:1
  PolygonID:1
    BatchID, colour, texture, shading data

PolygonID:2
    BatchID, colour, texture, shading data

⋮

PolygonID:n
    BatchID, colour, texture, shading data

TileID:2
  PolygonID:1'
    BatchID, colour, texture, shading data

PolygonID:2'
    BatchID, colour, texture, shading data

⋮

PolygonID:n'
    BatchID, colour, texture, shading data
⋮

TileID:n
  PolygonID:1"
    BatchID, colour, texture, shading data

PolygonID:2"
    BatchID, colour, texture, shading data

⋮

PolygonID:n"
    BatchID, colour, texture, shading data

FIG. 4

METHOD AND APPARATUS FOR DETERMINING PROCESSOR PERFORMANCE

CROSS REFERENCE TO RELATED APPLICATIONS

The present application is a national phase entry under 35 U.S.C. §371 of International Application No. PCT/GB2010/051530 filed Sep. 13, 2010, published in English, which claims the benefit of and priority to GB Patent Application Nos. 0916097.9, filed Sep. 14, 2009, 0916095.3, filed Sep. 14, 2009, and 0922452.8, filed Dec. 22, 2009, the entire disclosures of which are hereby incorporated by reference herein.

The present invention relates to a method and apparatus for determining processor performance.

When developing software for use in computer products it is known to determine the performance of a processor running this software. For example, it is known that during the development stage of a video game for a console such as the PlayStation® 3 console manufactured by Sony Computer Entertainment®, the graphics for a game are run on the graphics processor. The performance of the graphics processor (and other processors) is analysed during this simulation by a performance monitor block. This is sometimes called the "Perfmon Block". The Perfmon Block is connected to the graphics processor (and the other processors, such as an audio processor) and a memory.

The Perfmon Block receives the data from the graphics and/or audio processor at the same operating frequency as the processor. The performance data for each processor is generated by the Perfmon Block from this received data. This generated performance data and the call to which the generated performance data refers is then output to the memory to be analysed by the CPU. Currently, the performance data is output at a fixed sample rate.

It has been realised that having a fixed sample rate can be problematic. The selected fixed sample rate has to be high enough so that the accuracy of the collated performance data is sufficient. However, the selected fixed sample rate must not be too high to conserve memory bandwidth and CPU resources. This balance can be very difficult to achieve, especially when there are numerous processors connected to the Perfmon Block, and it is necessary to predict the sample rate in advance of the performance test. Additionally, the most appropriate sample rate varies over time depending on the processor behaviour. This exasperates selecting the correct sample rate.

In order to address this, some developers simply "simulate" the software using a single processor at a time. In other words, they disable all other processors and only run the test on a single processor. They then re-run the test with a different processor running. However, this approach has a disadvantage because the software as a whole is not tested, and is not replicating the use of the software by the consumer.

The present invention aims to address at least one of the above disadvantages.

According to one aspect of the present invention, there is provided a method of determining the performance of a processor when processing a unit of data, the method comprising the steps of: receiving, at a first sample rate, information indicating the performance of the processor when processing the unit of data; generating an identifier that identifies the unit of data being processed; comparing the identifier with previous identifiers at a second sample rate; and outputting the identifier of the unit of data being processed and the performance information when, during the comparing step, a predetermined condition is met.

This reduces the amount of Perfmon Block memory bandwidth used as the performance information is output to the memory only when required. Additionally, by outputting the performance information when required, not only is memory bandwidth reduced, but the accuracy of the performance data is improved. Furthermore, by outputting the performance information when required, "live" performance analysis is facilitated. "Live" performance analysis collects the performance data in real-time as the user interacts with the software. This interation will ideally not introduce a perceived performance change.

The method may comprise the steps of: outputting the identifier of the unit of the data being processed and the performance information to a memory; and providing an upper threshold on the second sample rate.

The upper threshold may be determined in accordance with the bandwidth of the memory.

The method may comprise setting a validity identifier, the validity identifier being set in accordance with a comparison between the performance data and a validity criterion indicating that such performance data is valid; and outputting the performance data in the event of both the predetermined condition being met and upon a positive comparison between the performance data and the validity criterion.

The performance data may include a counter value, and the identifier and performance information is output when the counter wraps.

The processor may be a graphics processor.

The graphic processor may be a tile based deferred rendering processor.

The condition may be i) changing of the tile identity; or ii) changing of the batch identity.

According to another aspect, there is provided an apparatus for determining the performance of a processor when processing a unit of data, the apparatus comprising:
a receiving device operable to receive, at a first sample rate, information indicating the performance of the processor when processing the unit of data;
a generating device operable to generate an identifier that identifies the unit of data being processed;
a comparing device operable to compare the identifier with previous identifiers at a second sample rate; and
an outputting device operable to output the identifier of the unit of data being processed and the performance information when, during the comparing step, a predetermined condition is met.

The outputting device may be operable to output the identifier of the unit of the data being processed and the performance information to a memory; and a providing device operable to provide an upper threshold on the second sample rate.

The upper threshold may be determined in accordance with the bandwidth of the memory.

The apparatus may comprise a setting device operable to set a validity identifier, the validity identifier being set in accordance with a comparison between the performance data and a validity criterion indicating that such performance data is valid; and the outputting device is operable to output the performance data in the event of both the predetermined condition being met and upon a positive comparison between the performance data and the validity criterion.

The apparatus may comprise a counter, wherein the performance data includes a counter value, and the identifier and performance information is output when the counter wraps.

The processor may be a graphics processor.

The graphic processor may be a tile based deferred rendering processor.

The condition may be i) changing of the tile identity; or ii) changing of the batch identity:

According to another aspect, there is provided a computer device comprising: a display driver operable to control a display; a central processing unit operable to control the display driver; a graphics processor coupled to both the display driver and the central processing unit; and an apparatus according to any one of the embodiments.

There is also provided the invention embodied as a computer program containing computer readable instructions and a computer readable storage medium configured to store the computer program therein or thereon.

Embodiments of the present invention are described, by way of example only, and with reference to the accompanying drawings, in which:

FIG. 4 shows the layout of data on a buffer in the processor of FIG. 3.

Figure 1:
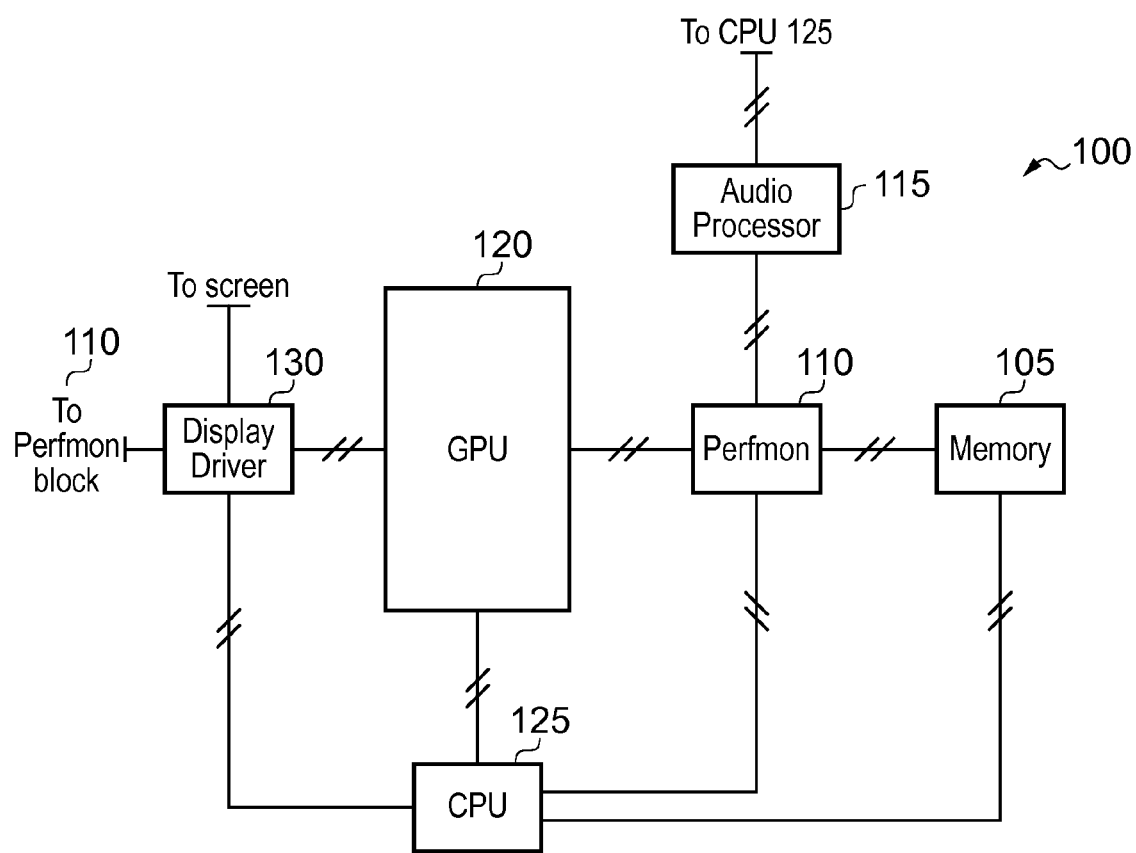
FIG. 1 is a block diagram showing a developer system.

Referring to FIG. 1, a developer system 100 is shown. The developer system 100 includes the components of the computer on which the software will run. In this specific embodiment, the developer system includes the components of a handheld console and specifically an audio processor 115, a graphics processor 120, a display driver 130 and a central processing unit 125. In addition to these components, the developer system 100 includes a performance monitor block 110 (a perfmon block) and a memory 105 coupled to the perfmon block 110. In embodiments, the handheld console also includes the perfmon block. However, it is envisaged that the perfmon block in the handheld console will not be operative.

Specifically, the CPU 125 is connected to the display driver 130, the graphics processor 120, the perfmon block 110, the audio processor 115 and the memory 105. The graphics processor 120 is additionally connected to the display driver 130 and the perfmon block 110. Finally, the perfmon block 110 is additionally connected to the memory 105, the audio processor 115 and the display driver 130. These components are connected by data buses as indicated in FIG. 1. It is envisaged that other components, such as a wireless network adapter, will be provided in the developer system 100 and/or the handheld console that are not shown in FIG. 1.

In embodiments of the invention, the graphics processor unit 120 uses tile-based deferred rendering (referred to as "TBDR" hereinafter) to generate computer graphics. TBDR is a known method for rendering computer graphics and is particularly suited to hand-held consoles. TBDR is described in general with reference to FIG. 2.

Figure 2:
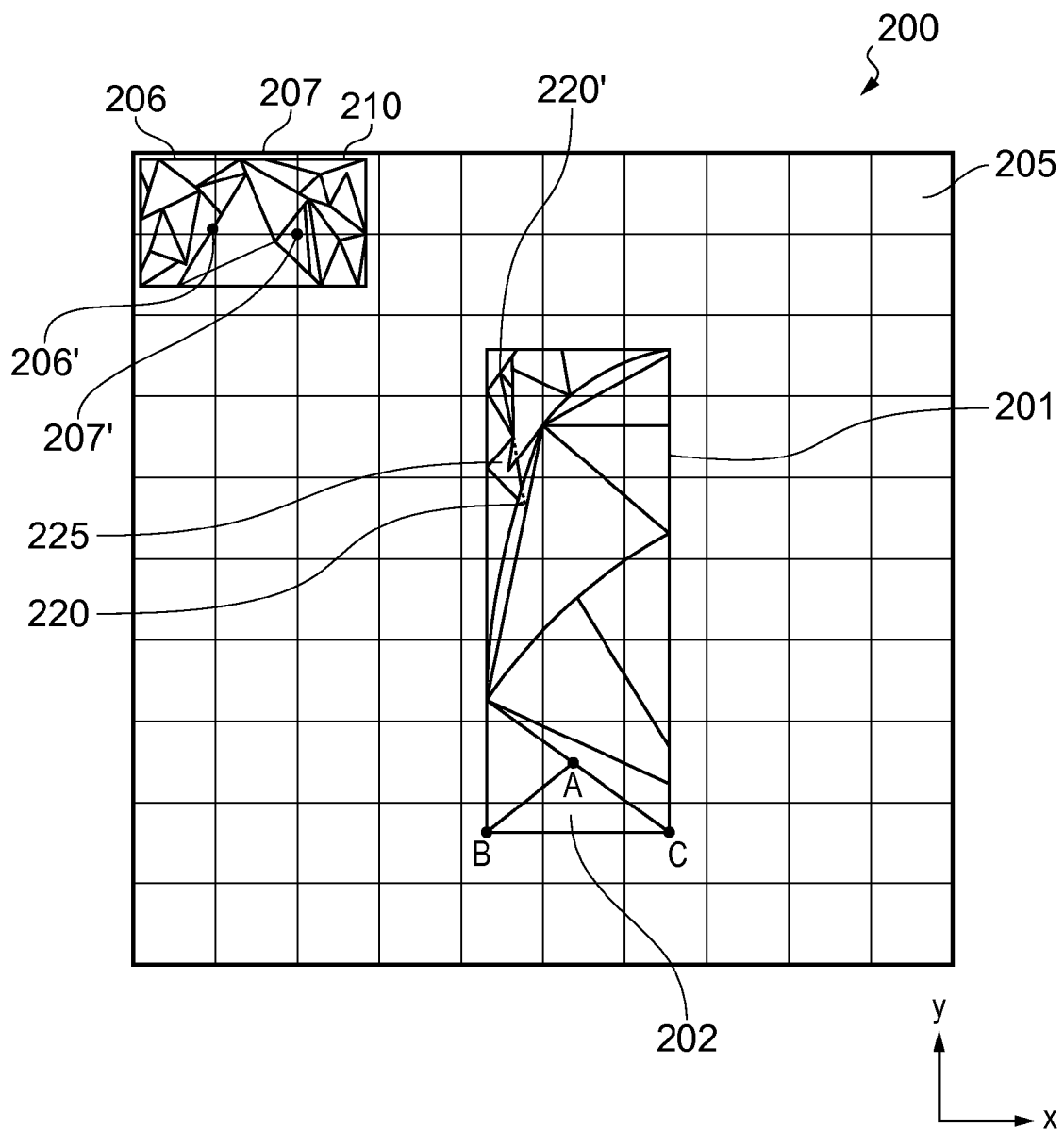
FIG. 2 is a representation describing tile-based deferred rendering artefact creation.

FIG. 2 shows an image 200 of a first rectangle 201 and a second rectangle 210. In order to draw the first rectangle 201, the CPU 125 instructs the graphics processor 120 to draw both the first rectangle 201 and the second rectangle 210. This instruction is performed using "batches". In other words, the first rectangle 201 is a first batch of work to be drawn by the graphics processor 120. This first batch of work is given a unique identifier in the image 200 by the graphics processor 110. Similarly, the second rectangle 210 is a second batch of work to be drawn by the graphics processor 120. This second batch of work is given a unique identifier in the image 200 by the graphics processor 110. The batch identifier is generated by the graphics processor 120 when instructed to draw the first and second rectangle by the CPU 125. This allocation takes place at the start of the geometry phase. In order to generate the unique identifier, the graphics processor 120 increments the identifier upon receiving each new batch. Typically, the unique identifier is seeded to be "0" at the start of every frame. To ensure that the identifier is unique within the frame, the size of the identifier has to be large enough to ensure that the unique identifier is unique within the frame.

The CPU 125, as part of the batch process provides the graphics processor 120 with polygon information required to draw both rectangles 201, 210. This polygon information details the polygons which will be used to make up the first rectangle 201 and the second rectangle 210. In the Figure, these polygons are triangles although the invention is not so limited and any polygon can be used as appreciated. Associated with each polygon are colour, shading and texture information.

When generating the image 200 on the screen, the graphics processor 120 first splits the screen into "tiles". A tile 205 is a block of pixels in some embodiments, although the invention is not so limited. For example, in FIG. 2, each tile is a block of pixels which is 4 pixels wide (i.e. 4 pixels in the x-direction) and 4 pixels high (i.e. 4 pixels in the y-direction), although other appropriate sizes such as 16 pixels wide and 16 pixels high are also envisaged. Additionally, the tiles may be single pixels or may even be non-uniform. For example, a tile may be 16 pixels wide and only 4 pixels high. It should be noted here that the allocation of the tile is made when the image is to be rendered. In other words, in one image on the screen each tile may be 4 pixels wide and 4 pixels high but in the next image on the screen, each tile may be 16 pixels wide and 16 pixels high.

Each tile is given a unique identifier. This enables the graphics processor 120 to identify each tile uniquely in the image. In embodiments, the tiles are given an identifier based on the location, in terms of x,y co-ordinates of one point of the tile on the screen. So, in the example of FIG. 2, the co-ordinates of point 206' is the point of tile 206 that determines the identifier of the tile. As the tile is 4 pixels wide and 4 pixels high, point 206' is located at position (4,4) on the screen—where the top left corner of the image is (0,0). Thus, tile 206 is given the identifier tile (4,4). Similarly, point 207' is located at (8,4) and so the identifier of tile 207 is tile (8,4). This identification process is carried out for each tile in the image 200. It should be noted that the invention is not limited to this numbering system, and any system enabling any tile to be uniquely identified in the image is envisaged.

There are two distinct phases in embodiments of the present invention; the geometry phase and the rasterisation phase. The division of the screen into tiles takes place during the geometry phase, and the drawing of the two rectangles takes place during the rasterisation phase.

After the screen has been divided into tiles, the graphics processor 120 will draw the first and second rectangle 201 and 210 using the polygons provided by the CPU 125. This is illustrated in FIG. 2. For clarity, the polygons are triangles and only a first triangle 202 and a second triangle 225 are highlighted. The triangles are defined by their three vertices. So, for example, triangle 202 will be defined by the pixel positions ABC. The vertices of the triangle provide a unique identifier for each triangle.

With regard to triangle 225, it should be noted that two areas of the triangle 220 and 220' are located underneath other triangles. This is indicated in the Figures by dashed lines. In other words, areas 220 and 220' will not be visible in the image 200.

The graphics processor 120 determines which tiles contain which triangle. This can be achieved because the vertices of each triangle are known and the geometry of each tile is also known. This means that the graphics processor 120 knows for each batch which tiles are to be used and determines for each tile the triangles that are to be placed in that tile, as well as the colour and texture information for each triangle. The above is the geometry phase of rendering in TBDR. The graphics processor 120 then sorts the triangles so that only areas that are to appear on the screen will ultimately be rendered. In other words, as the areas 220 and 220' of the triangle 225 are located underneath other triangles (and so would not be visible on the screen), areas 220 and 220' will not be rendered on the screen. This is part of the rasterisation phase of rendering in TBDR, although it could be carried out as part of the geometry phase.

Figure 3:
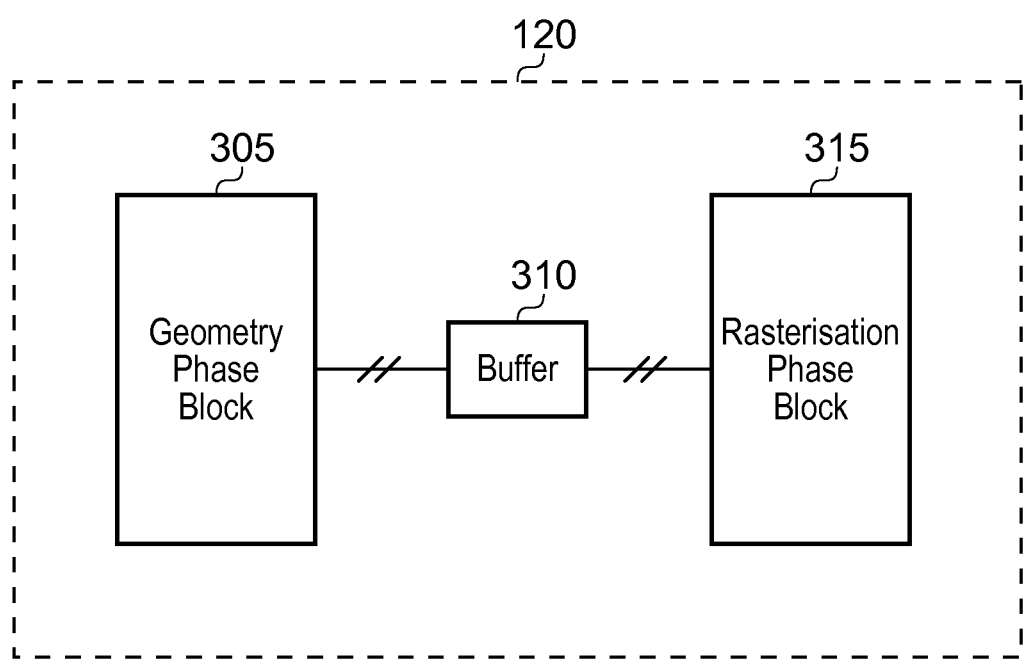
FIG. 3 is a block diagram showing a tile-based deferred rendering graphics processor according to embodiments of the claimed invention.

FIG. 3 shows a block diagram of the graphics processor 120. The graphics processor 120, in embodiments of the invention, has a geometry phase block 305 connected to an intermediate buffer 310 by a bus. The intermediate buffer 310 is connected to a rasterisation phase block 315 again by a bus.

After the graphics processor 120 has completed the geometry phase of TBDR, the acquired information is fed into the intermediate buffer 310 for storage. Within the intermediate buffer 310, the data is stored in a manner shown in FIG. 4. As is seen in FIG. 4, for each tile ID the polygons making up that tile are defined. Additionally, for each identified polygon, the batch ID, colour, texture and shading data are stored.

In order to generate the image 200 on the screen, relevant information stored in the intermediate buffer 310 is retrieved by the rasterisation phase block 315. The rasterisation phase block 315 does not draw each batch. Instead the rasterisation block 315 draws each tile. In order to draw a tile, the rasterisation phase block 315 firstly determines the tile upon which it is about to work. The rasterisation phase block 315 uses the obtained polygon information to draw the visible areas of the polygon. The appropriate colour, shading and texture are applied to the visible areas of that polygon.

Although each tile can be drawn in sequence (i.e. the first tile is drawn and then the second tile is drawn), this may not be the case. In some cases, "time slicing" takes place. Time slicing is the process by which the graphics processor 120 draws a tile out of sequence. This can occur if the graphics processor 120 starts drawing a tile but requires other information to complete the drawing of the tile currently being drawn. Typically, this may be some texture data from the CPU 125. Rather than waiting for that other information to complete the drawing of that tile, the graphics processor 120 starts drawing another tile.

After a tile is drawn, it is moved from the rasterisation phase block 315 of the graphics processor 120 to the display driver 130 for storage in an image buffer (not shown). After all the tiles have been completed, and stored in the image buffer of the display driver 130, the image 200 is output to a screen.

Interaction with Perfmon Block 110

As noted earlier, during the development stage of a piece of software it is necessary to analyse the performance of different processors in the system when running the software. This analysis helps improve the speed at which the software is executed and also ensures that the software is stable (i.e. does not cause the system to fail). Accordingly, performance data may be data indicating that the processor is running at a certain capacity, or indicating that the processor has crashed. This means that the Perfmon block 110 obtains data from each processor in the system 100. However, for clarity, only the interaction of the graphics processor 120 with the Perfmon block 110 will now be described. In other words, the manner in which the perfmon block 110 determines the performance of the graphics processor 120 when generating image 200 will now be described.

In order to determine the amount of time the graphics processor takes to process a particular task, the perfmon block 110 receives a number of count signals from the graphics processor 120. In embodiments, the graphics processor 120 has a number of count signals issued therefrom and the perfmon block 110 has a corresponding number of counters included therein (i.e. one counter in the perfmon block 110 for each count signal from the graphics processor). However, for the following, only one count signal from the graphics processor 120 and one counter in the perfmon block 110 will be described for convenience.

The count signal from the graphics processor is either a 1 or a 0 and cycles between the two values at the same frequency as the clock frequency of the graphics processor unit 120. This count signal is fed into one 16 bit counter located within the perfmon block 110. The counter within the perfmon block 110 count each time the count signal from the graphics processor 120 goes to 1. Additionally fed into the perfmon block 110 from the graphics processor 120 is information identifying the task that the graphics processor 120 is currently performing.

This task is the batch ID and the tile ID currently being performed by the graphics processor 120. The batch ID and tile ID are output to the perfmon block 110 alongside the counter signal. As the batch ID and tile ID are output at the same frequency as the counter signal, the perfmon block 110 is able to determine how long each task performed by the graphics processor 120 takes.

Figure 5:
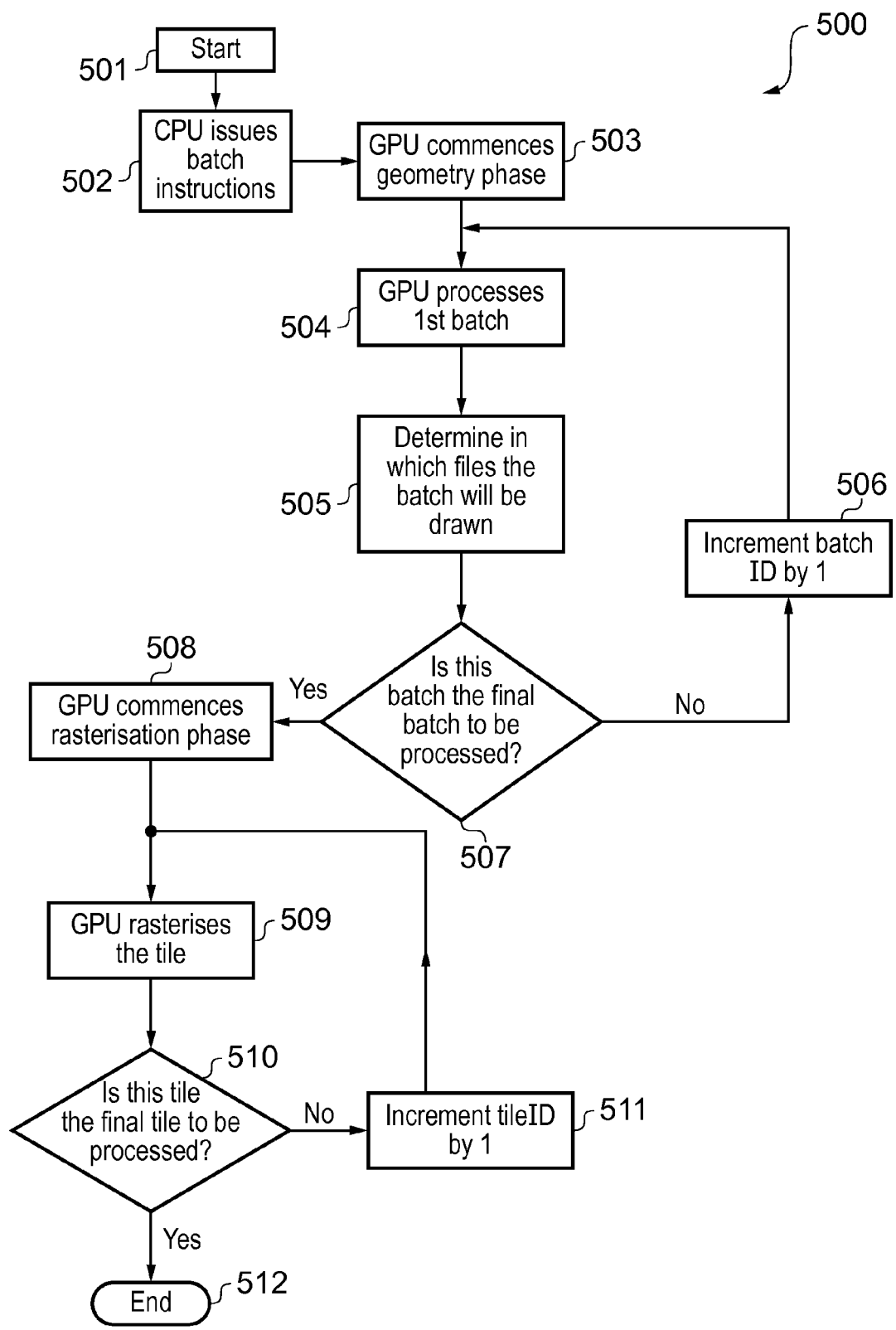
FIG. 5 shows a flow-chart explaining the operation of the system of FIG. 1.

The interaction of the perfmon block 110 is described with reference to the flow chart 500 of FIG. 5.

When image 200 is to be drawn, the perform block 110 begins at step 501.

The CPU 125 issues two batch instructions to the graphics processor at step 502. As noted above, one batch instruction relates to the first rectangle 201 and the second batch instruction relates to the second rectangle 210. Each batch instruction includes the polygon information required to draw the first and second rectangle respectively.

The graphics processor 120 begins the geometry phase of the image processing at step 503. In order to perform the geometry phase of the image processing, the graphics processor 120 begins processing the first batch instruction at step 504. In other words, the graphics processor 120 begins the geometry phase processing of the first rectangle 201. This will be apparent to the perfmon block 110 because the batch ID output thereto will indicate the batch ID of the first rectangle 201. As the counter in the perfmon block 110 counts the number of times the count signal in the graphics processor 120 goes to 1 (i.e. the number of clock cycles used by the graphics processor 120 in processing the first batch in the geometry phase), the perfmon block 110 output can thus be used to determine the length of time required by the graphics processor 120 to process the first batch in the geometry phase.

The tiles in which the first rectangle 201 will be drawn, and associated polygons, are determined (step 505). This concludes the geometry phase for the first batch (i.e. the first rectangle 201). It is decided whether this batch is the last batch that needs geometry phase processing (step 507). In this case, there is a second batch to process (i.e. the second rectangle 210).

Therefore, in step 506 the batch ID that is processed is changed. This change in batch ID, for example, means that a valid "condition" is met. Thus, the value of the counter within the perfmon block 110 for this batch ID, along with the batch ID itself, is output to the memory 105. The counter within the perfmon block 110 is then reset. Although the batch ID is given as an example condition, the invention is not so limited and any arbitrary condition is also envisaged.

The second batch (i.e. second rectangle) is then subjected to the geometry phase processing as explained above.

After the geometry phase processing on the second batch has taken place, there are no further batches to be processed in the geometry phase of this embodiment. Thus, the answer to the question at step 507 is "yes".

In step 508, the graphics processor 210 then commences the rasterisation phase. In order to do this, the first tile is rasterised (step 509). During this rasterisation, the counter signal and the tile ID is output to the perfmon block 110. This again indicates the length of time taken to rasterise the first tile. After the first tile has been rasterised a check is carried out at step 510 to determine if this rasterised tile is the final tile to be processed. As the tile is not the final tile to be rasterised then the tile ID is incremented and the next tile is rasterised (step 511). The incrementing of the tile ID to generate the new tile ID is a valid "condition" and so the value of the counter in the perfmon block 110, along with the tile ID is output to the memory 105 and stored in association therein. The counter is then reset. By storing the tile ID and the batch ID in association with the number of counter cycles for each, it is possible to determine the length of time it takes for the graphics processor to process the particular tile and batch.

If at step 510 the check indicates that the tile that had just been rasterised is the final tile, then the process ends (step 512).

The above notes that the counter value is output to the perfmon block 110 when a certain condition is met. In embodiments, a timestamp is also provided to the perfmon block 110. The timestamp is obtained from a system-wide clock which defines the time at which the counter value and the batch ID and/or tile ID was output to the perfmon block 110. This timestamp identifies the state of the graphics processor 120 at the time specified by the timestamp. Moreover, by using a timestamp obtained from a system-wide clock, it is also possible that other processors can also output performance monitoring data to the pert non block 110 and that it is possible to associate the performance of other processors (such as the audio processor) with the performance of the graphics processor 120 at that particular time. This improves the performance analysis of the development system.

Therefore, in the memory 105 are stored the details of each task carried out by the graphics processor 120. In this case, the task includes the geometry phase and separately the rasterisation phase. The details of the tasks are stored in association with the length of time taken for that particular task. Also, in the memory the "condition" which triggered the sampling of the performance data is stored in the memory 105. Further, the timestamp when the performance data was sent to memory 105 is stored in memory 105. This information can be retrieved by the CPU 125.

By outputting the performance data from the perfmon block 110 when the tile ID and/or batch ID changes means that memory bandwidth is efficiently used. To put it another way, by outputting the performance data from the perfmon block 110 when the "condition" of the data being collated changes means that memory bandwidth is efficiently used.

This is because, as noted above, in other systems the data being collated is output from the perfmon block 110 is output at a fixed sample rate. Therefore, in order to ensure that performance data for each tile and/or batch is output using these other systems would require a very high sample rate. This is because some tiles and batches are very easy to process and so take a fraction of the time to process as more complicated tiles and/or batches. Thus, in order to increase the chance of the information relating to these simpler tiles and/or batches being collected, the sample rate would have to be high. However, as noted earlier, a high sample rate means that memory bandwidth, and CPU processing requirements are increased. Additionally, as the sampled data needs to be stored before being processed, this increases the size of memory 105 consumed.

As noted above, the graphics processor 120 may render graphics using a "time slice" technique. This technique allows the graphics processor 120 to stop processing one tile whilst waiting for data from another part of the system and commence processing a different tile. In embodiments of the invention, this means that, as the tile ID has changed, there will be at least two entries in the memory 105 for such tile. By differentiating these entries in the memory is useful. If the data from the other part of the system takes a proportionally long time to obtain, then it is possible for the developer to identify this and take corrective action. For instance, the developer could identify that the performance of the other part of the system is not adequate, or that a different texture be used or the like.

Moreover, in images where very simple batches and tiles are to be rendered, the speed at which the performance data is sampled from the perfmon block 110 will be very high. This is because the rate at which the tile ID and/or batch ID changes is very high. In order to further reduce the memory bandwidth used, an upper limit of sample data is imposed in embodiments. This bandwidth will depend, to some extent, on the number of counters used. If there are a large number of counters written to memory, then a lower upper limit is used to prevent the bandwidth being flooded. As conditional sampling takes place (which reduces the memory bandwidth requirements), this upper limit is higher than the upper limit in known fixed sampling systems.

In the foregoing embodiments, at least one counter in the perfmon block 110 is used. Counters have a "wrap" condition. In other words, when the counter has reached the maximum count, the counter is reset and begins counting again. In order to ensure that the performance data is not lost when the counter "wraps", one other condition in which the performance data is output to the memory 105 is when the counter wraps. This ensures that the performance data is not lost and increases the accuracy of such data.

Additionally, it should be noted here that in embodiments, the performance data is only output when it is valid data. The performance data is valid when all the bits defined in an "On Condition Validity Mask" are matched. However, other valid and non-valid conditions are also envisaged. For example, a tile processing cycle is only valid when the graphics processor 210 is currently processing a tile. Moreover, one further condition in which the performance data is output is when the valid condition changes from "valid" to "not-valid" or vice versa.

Although the foregoing relates to measuring the performance of the graphics processor 120, the invention is not limited. Indeed, any processor performance can be measured. This is indicated by the display driver 130 and the audio processor 115 also being connected to the perfmon block 110 in FIG. 1.

The Graphics Processor 120

In embodiments of the invention, the graphics processor 120 is a tile based deferred rendering processor. This is described in FIG. 3.

As noted hereinbefore, the graphics processor 120 comprises a geometry phase block 305 connected to a buffer 310. The buffer 310 is connected to the rasterisation phase block 315. In embodiments, the geometry phase block 305 and the rasterisation phase block 315 are hardware. The buffer 310 stores the batch ID and the tile ID to which the polygon is associated. In other words, the buffer 310 details the identity of each tile used in each batch. This is particularly useful.

As noted before, in tile based deferred rendering, the workload during the geometry phase is the batch. However, during the rasterisation phase, the workload is the tile. Therefore, by storing the additional data in the buffer 310, if during performance analysis it is identified that a particular tile is causing the rendering to stall, or even causing the system as a whole to crash, then it is possible to identify the batch which is associated with the performance issue. This means that it is possible for the developer to address this issue in the user application program or graphics application program domain.

Additionally, it should be noted here that the CPU 125 can access the data stored in the buffer 310. Indeed, the data stored in the buffer 310 can be propagated throughout the system in the pipeline. This is useful because the performance of different processors, for example the audio processor 115, may be affected by different tasks carried out on the graphics processor 120. So, for example, if the performance of the audio processor 115 decreases when a certain batch is being processed by the graphics processor 120, then this can be identified by the developer by having the batch ID propagated throughout the system 100. Further, if the CPU 125 crashes, the propagated batch ID is output to a core dump. This allows the developer to analyse whether processing a particular batch caused the CPU 125 to crash.

As a de-bugging feature, the graphics processor 120 can have data break-points. This means that if one particular memory location, or memory location range of the buffer 310 or memory 105 is written to, or read from by the graphic processor 120, the system 100 will stop and relevant operating information will be written to a memory dump for analysis. The parameters for initiating a break point and the relevant operating information are set by the developer.

The foregoing embodiments may be implemented as computer software code. This code will configure a computer to operate in a particular way. The computer software may be embodied as signals which may be stored on a storage medium such as an optical or magnetic recording medium or even on solid state memory. Additionally, or alternatively, the signals and/or code may be stored on a network or may be transferred across a network, such as the Internet or a Local Area Network.

The invention claimed is:

1. A method of determining performance of a processor when processing a unit of data, the method comprising the steps of:
   receiving, at a first sample rate, data indicating the performance of the processor when processing the unit of data;
   generating, with a processor, an identifier that identifies the unit of data being processed, wherein the identifier identifies a tile or a batch of tiles associated with the unit of data;
   comparing the identifier with previous identifiers at a second sample rate, the second sample rate being less than the first sample rate; and
   outputting the identifier of the unit of data being processed and the performance data when, during the comparing step, a predetermined condition is met, the predetermined condition being either changing of a tile identity or changing of a batch identity.

2. A method according to claim 1, wherein:
   the identifier of the unit of the data being processed and the performance data are output to a memory; and
   the method further comprises providing an upper threshold on the second sample rate.

3. A method according to claim 2, wherein the upper threshold is determined in accordance with a bandwidth of the memory.

4. A method according to claim 1, further comprising:
   setting a validity identifier, the validity identifier being set in accordance with a comparison between the performance data and a validity criterion indicating that such performance data is valid; and
   outputting the performance data in the event of both the predetermined condition being met and upon a positive comparison between the performance data and the validity criterion.

5. A method according to claim 4, wherein the performance data includes a counter value, and the validity identifier and performance data are output when the counter value wraps.

6. A method according to claim 1, wherein the processor is a graphics processor.

7. A method according to claim 6, wherein the graphics processor is a tile based deferred rendering processor.

8. A method according to claim 1, wherein when the predetermined condition is met, outputting of the performance data indicates that memory bandwidth is being efficiently used.

9. An apparatus for determining performance of a processor when processing a unit of data, the apparatus comprising:
   a receiving device operable to receive, at a first sample rate, data indicating the performance of the processor when processing the unit of data;
   a generating device operable to generate an identifier that identifies the unit of data being processed, wherein the identifier identifies a tile or a batch of tiles associated with the unit of data;
   a comparing device operable to compare the identifier with previous identifiers at a second sample rate, the second sample rate being less than the first sample rate; and
   an outputting device operable to output the identifier of the unit of data being processed and the performance data when, during the comparing step, a predetermined condition is met, the predetermined condition being either changing of a tile identity or changing of a batch identity.

10. An apparatus according to claim 9, wherein the outputting device is operable to output the identifier of the unit of the data being processed and the performance data to a memory; and
the apparatus further comprises a providing device operable to provide an upper threshold on the second sample rate.

11. An apparatus according to claim 10, wherein the upper threshold is determined in accordance with a bandwidth of the memory.

12. An apparatus according to claim 9, further comprising:
a setting device operable to set a validity identifier, the validity identifier being set in accordance with a comparison between the performance data and a validity criterion indicating that such performance data is valid;
wherein the outputting device is operable to output the performance data in the event of both the predetermined condition being met and upon a positive comparison between the performance data and the validity criterion.

13. An apparatus according to claim 9, further comprising a counter, wherein the performance data includes a counter value, and the validity identifier and performance data are output when the counter value wraps.

14. An apparatus according to claim 9, wherein the processor is a graphics processor.

15. An apparatus according to claim 14, wherein the graphics processor is a tile based deferred rendering processor.

16. An apparatus according to claim 9, wherein when the predetermined condition is met, outputting of the performance data by the outputting device indicates that memory bandwidth is being efficiently used.

17. A computer device comprising:
a display driver operable to control a display;
a central processing unit operable to control the display driver;
a graphics processor coupled to both the display driver and the central processing unit; and
an apparatus for determining performance of a processor when processing a unit of data, the apparatus comprising:
a receiving device operable to receive, at a first sample rate, data indicating the performance of the processor when processing the unit of data;
a generating device operable to generate an identifier that identifies the unit of data being processed, wherein the identifier identifies a tile or a batch of tiles associated with the unit of data;
a comparing device operable to compare the identifier with previous identifiers at a second sample rate, the second sample rate being less than the first sample rate; and
an outputting device operable to output the identifier of the unit of data being processed and the performance data when, during the comparing step, a predetermined condition is met, the predetermined condition being either changing of a tile identity or changing of a batch identity.

18. A non-transitory computer readable storage medium storing a computer program therein, the computer program, when executed by a processor, causes the processor to perform a method of:
receiving, at a first sample rate, data indicating the performance of the processor when processing the unit of data;
generating an identifier that identifies the unit of data being processed, wherein the identifier identifies a tile or a batch of tiles associated with the unit of data;
comparing the identifier with previous identifiers at a second sample rate, the second sample rate being less than the first sample rate; and
outputting the identifier of the unit of data being processed and the performance data when, during the comparing step, a predetermined condition is met, the predetermined condition being either changing of a tile identity or changing of a batch identity.

* * * * *